United States Patent [19]

Miller et al.

[11] Patent Number: 5,020,716

[45] Date of Patent: Jun. 4, 1991

[54] INTEGRATED BRAZING FIXTURE FOR BRAZING TITANIUM

[75] Inventors: Steven M. Miller, Jupiter; Daniel A. Bales, Palm City, both of Fla.

[73] Assignee: United Technologies Corporation, Hartford, Conn.

[21] Appl. No.: 457,080

[22] Filed: Dec. 26, 1989

[51] Int. Cl.$^5$ .............................................. B23K 37/00
[52] U.S. Cl. .................................. 228/212; 228/49.1; 269/313
[58] Field of Search .................... 228/49.1, 212, 44.3; 269/311, 312, 313

[56] References Cited

U.S. PATENT DOCUMENTS

| | | | |
|---|---|---|---|
| 2,326,430 | 6/1940 | Blanchard | 228/212 X |
| 2,614,517 | 5/1951 | Peterson | 228/212 X |
| 2,944,504 | 11/1954 | Herman et al. | 228/212 X |
| 3,094,957 | 9/1959 | Knauf, Jr. | 228/212 X |
| 4,212,690 | 7/1980 | Beuyukian et al. | 148/131 |

Primary Examiner—Kenneth J. Ramsey
Attorney, Agent, or Firm—Christopher T. Hayes

[57] ABSTRACT

The present invention provides a method and means for maintaining metal parts in fixed relation to each other throughout a brazing cycle. The fixed relation is maintained by supporting the parts on concentric support rings made of the same alloy as the parts. The support rings lie within backup rings which exhibit high creep strength at the temperature necessary to braze the parts. The backup rings are slideably supported on a base, and a cover is provided which cooperates with the base to prevent furnace contaminants from contacting the parts during the brazing cycle.

20 Claims, 2 Drawing Sheets

INTEGRATED BRAZING FIXTURE FOR BRAZING TITANIUM

TECHNICAL FIELD

This invention relates to brazing and particularly to a brazing fixture for brazing titanium alloy components.

BACKGROUND ART

Components such as those used in the aerospace industry, and the like, are typically subjected to high stresses and high temperatures. The materials from which these components are made often dictate the operating limits for the apparatus in which they are employed. Extensive efforts have been made over the years to develop new alloys which permit operation of these components at higher operating temperatures and/or which lead to lighter weight, longer lived components. One group of alloys which has been found to be useful in fabricating these components are the titanium based alloys. These alloys are generally light weight and exhibit high temperature durability. However, due in part to this high temperature durability, fabrication of components from titanium based alloys presents problems for the manufacturer.

One common method of manufacturing metallic components is brazing, in which two or more metal parts are joined by applying heat and a brazing filler metal. The filler metal used has a melting temperature below the melting temperature of the metal parts being joined. When the metal parts are heated to a temperature above the melting temperature of the brazing filler metal the brazing filler metal flows by capillary action into gaps between the metal parts and joins them by creating a metallurgical bond between them at the atomic level. The brazing process is similar to soldering, but differs in that the filler metal is of greater strength, and has a higher melting temperature than soldering material. When properly designed a brazed joint will yield a high degree of serviceability under concentrated stress, vibration and temperature loads. Brazing is, therefore, a highly desirable method of joining metal parts used in aerospace components.

Common to the brazing of most metal parts is the problem of maintaining the parts in fixed relation to each other throughout the brazing cycle. Although parts may be oriented correctly when first placed on the surface which is to support them during brazing, differences in thermal expansion rates between the parts and the surface tend to distort and shift the parts with respect to each other. As a result, the parts may require significant post-braze machining or other operations to bring the parts within allowable tolerances. Brazing fixtures, such as those disclosed in U.S. Pat. Nos. 2,326,430; 2,614,517; 2,944,504; 3,094,957 and 4,212,690 which are incorporated herein by reference, attempt to reduce distortion and shifting of parts either by applying force to the parts to hold them rigidly in place during the brazing cycle, or by allowing the parts to slide over the surface which supports them during the brazing cycle. However, due to problems encountered in brazing large titanium alloy parts, neither of these characteristics is desirable in a fixture for brazing such parts.

In order to successfully braze titanium alloy parts, the parts must be held in fixed relation to each other at high temperature for an extended period of time. Typically, the brazing of large titanium parts may require maintaining temperatures exceeding 1700° F. for in excess of four hours. At brazing temperature, the titanium alloy parts have minimal creep strength, and applying force to the parts to maintain them in a specific position could distort the shape of the individual parts, requiring substantial post-braze machining. Additionally, the thermal stresses which may build up in the parts due to differences in thermal expansion between the parts and the surface on which they are supposed to slide can cause the parts to shift with respect to each other during the brazing cycle, introducing distortion which requires post-braze machining to correct. Likewise those thermal stresses may remain in the parts after the brazing cycle is complete, requiring further treatment to relieve the stress.

In order to maintain large titanium parts in fixed relation to each other throughout the brazing process, the parts must be supported by a fixture which will not exert excessive force on the parts being brazed, and which exhibits thermal expansion essentially equal to that of the titanium parts being brazed so that the parts do not have to slide with respect to the surface which supports them. Ideally, a fixture would be made of the same material as the titanium alloy parts being brazed, so that thermal expansion between the parts and the fixture would be matched, and the parts would not shift. However, as mentioned above, at the temperature required to braze titanium alloy components, a fixture made of the titanium alloy has minimal creep strength and would tend to distort under the weight of the parts if not supported, shifting the position of the parts despite thermal matching of the parts and the support surface. It is, therefore, an object of the present invention to provide a brazing fixture which matches the thermal expansion of the titanium alloy parts, and resists creep at braze temperature, thereby maintaining the titanium alloy parts in fixed relation to each other throughout the brazing cycle.

DISCLOSURE OF THE INVENTION

According to the present invention, the foregoing and other objects are attained by providing an integrated brazing fixture wherein metal parts to be brazed are supported on two concentric support rings which have coefficients of thermal expansion essentially equal to that of the parts being brazed, the coefficients of thermal expansion being close enough that any difference in thermal expansion between the support rings and the parts being brazed is of such a small magnitude that the difference in thermal expansion does not distort the relative positions of the parts beyond allowable tolerances. Each of these support rings is received within a backup ring which is in turn supported by a base. The backup rings are made of a material which exhibits superior creep strength at braze temperature and has a coefficient of thermal expansion which is less than that of the support rings. At room temperature, clearance is provided between the outer diameter of each support ring and the backup ring in which it is received to allow for the difference in thermal expansion between the support rings and the backup rings. The base is made of a material which has a coefficient of thermal expansion greater than that of the support rings, and which resists the deleterious phase changes and dimensional changes which often occur in many alloys as a result of thermal cycling to elevated temperatures. During heat up in a vacuum furnace, the support rings thermally expand at the same rate as the metal parts, maintaining the parts in fixed relation to each other. Since the backup rings expand the least, the backup rings slide radially with respect to the base and the support rings. Near braze temperature, the support rings expand into contact with the backup rings, which come into contact with positioning pins on the base which ensure proper positioning of the support rings and the backup rings at braze temperature.

The parts are protected from contaminants in the furnace by a cover which includes a vent structure that prevents such contaminants from contacting the metal parts during the brazing cycle. Use of the present invention in brazing large titanium alloy parts such as jet engine inlets has significantly reduced the amount of component distortion which normally occurs using conventional brazing fixtures. Consequently, the amount of post-braze machining necessary to bring the component within allowable tolerances has been significantly reduced.

The foregoing and other features and advantages of the present invention will become more apparent from the following description and accompanying drawings.

BEST MODE FOR CARRYING OUT THE INVENTION

Although the embodiment set forth in detail below relates to the use of a brazing fixture for brazing titanium parts, it is offered merely for illustration and is not intended to limit the scope of the present invention. As used herein the term "room temperature" means that temperature at which metal parts would normally be loaded onto the brazing fixture of the present invention, approximately 70° F.; the term "braze temperature" means the temperature at which the metal parts must be maintained in order to melt the filler metal, approximately 1700+° F.; and the term "brazing cycle" refers to the heat up of the metal parts and brazing fixture from room temperature to braze temperature, and the subsequent cool down to room temperature.

Figure 1:
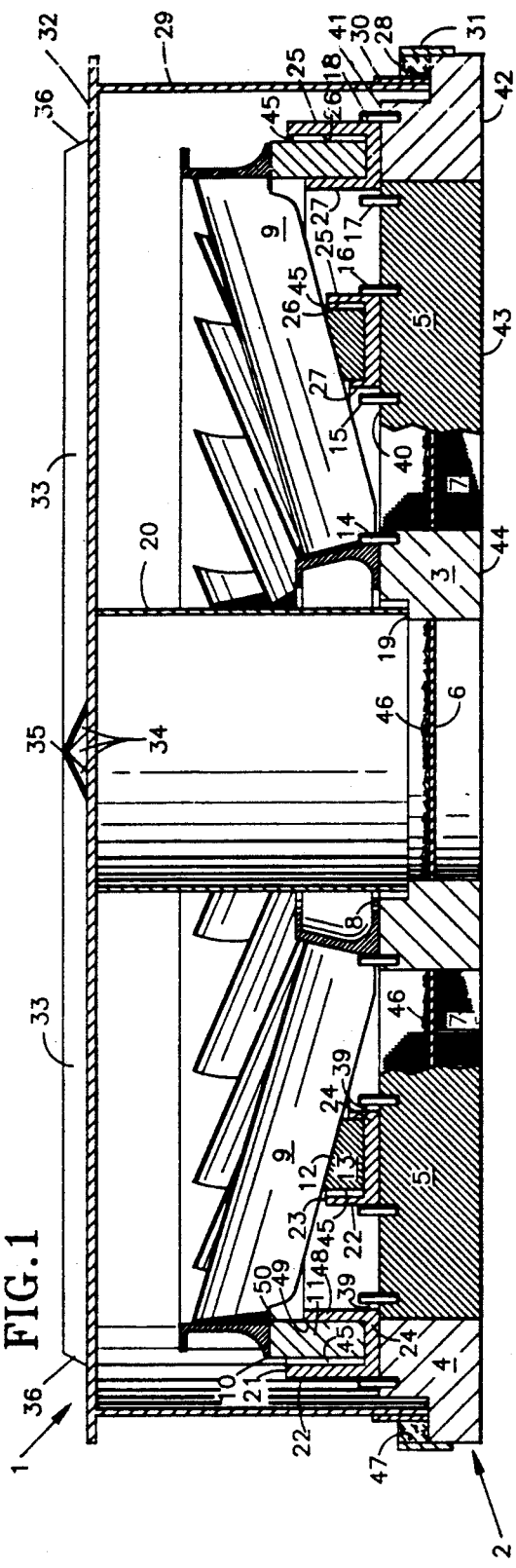
FIG. 1 is an elevational view partly in section taken at line 1—1 of FIG. 2 showing parts to be brazed and the relative positions of the various elements of the fixture of the present invention at room temperature.
Figure 3:
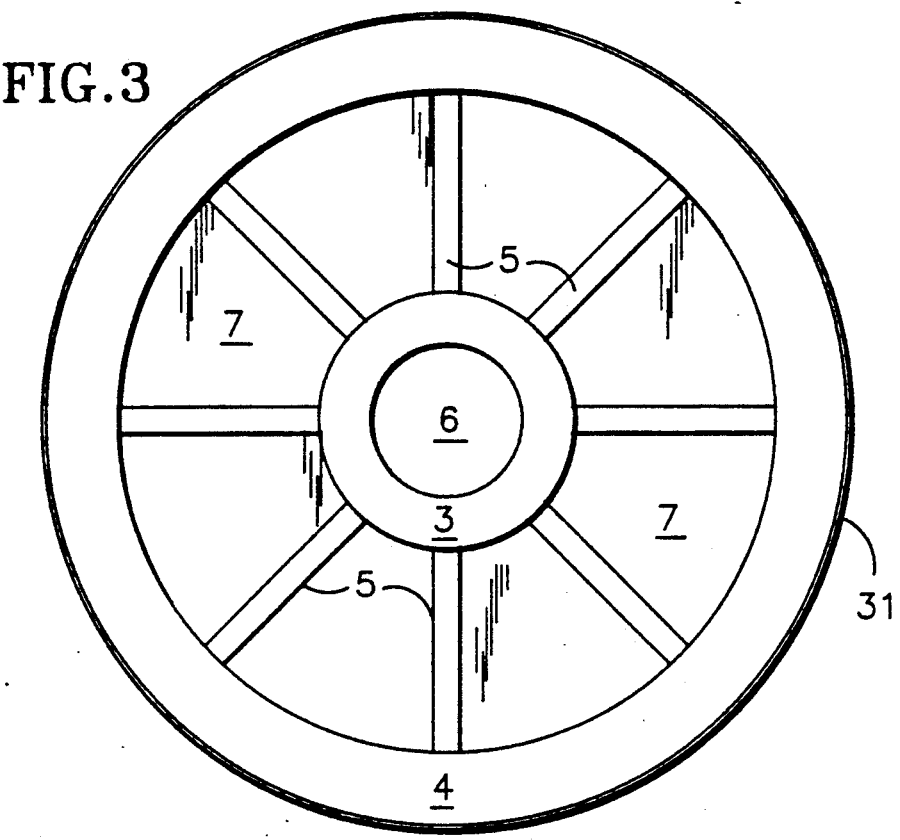
FIG. 3 is a bottom view of the base of the present invention.

Referring now to FIG. 1, there is shown an elevational view partly in section of the present invention including a cover 1 and a base 2. The base 2 includes an inner ring 3 and an outer ring 4 with radially extending members 5 connected therebetween. As shown in FIG. 3, a circular pan insert 6 is circumferentially connected to the inner diameter of the inner ring 3. Other pan inserts 7 are located in the spaces bounded by the inner ring 3, the outer ring 4 and the radially extending members 5. These pan inserts 7 are somewhat pie-shaped and the entire perimeter of each insert is connected to the inner ring 3, the outer ring 4 or one of the radially extending members 5. The pan inserts 6, 7 are relatively thin as compared to the height of the radially extending members 5, and the pan inserts 6, 7 are located well below the parts 9 being brazed so that any distortion in the pan inserts 6, 7 which may occur during the brazing cycle does not allow the pan inserts 6, 7 to come in contact with the parts 9. Furthermore, as a consequence of the cross-sectional area of the pan inserts 6, 7 being minor as compared to the cross-sectional area of the other base members 3, 4, 5 any distortion which does occur in the pan inserts 6, 7 does not cause the base 2 to distort. Prebuckling of the pan inserts 6, 7 can be utilized to further reduce pan distortion during the brazing cycle.

The connection between the inner ring 3, the outer ring 4, the radially extending members 5 and the pan inserts 6, 7 may be by welding or by any other method of connection which prevents the passage of furnace contaminants through the base during the brazing cycle. The inner ring 3 includes a support surface 8 which supports the radially innermost section of the titanium parts 9 being brazed. The parts 9 are supported at the radially outermost section by the support surface 10 of the outer support ring 11. Since the parts 9 may distort under their own weight at braze temperature, further support for the parts 9 is provided by support surface 12 of the inner support ring 13. Each of these support rings 11, 13 provide primary support for the parts 9 in that the parts 9 are supported directly by the support rings 11, 13. Secondary support for the parts 9 is provided by backup rings 21, 23, which indirectly support the parts 9 by supporting the support rings 11, 13.

Each of the backup rings 11, 13 has a first wall 22 perpendicular to a second wall 24, and a third wall 48 perpendicular to the second wall 24. The first wall 22 includes a radially outermost face 25, a radially inner surface 26, and the third wall 48 includes a radially outer surface 49 and a radially innermost face 27. The purpose of these backup rings 21, 23 is discussed in greater detail below. A plurality of positioning pins 14, 15, 16, 17, 18 cooperate with holes in the base 2 to position the parts 9 and the backup rings 21, 23. Pins 14 are located on the support surface 8 of the inner ring 3. These pins 14 maintain the parts 9 in fixed relation to each other and concentric with the inner ring 3 at room temperature. Backup ring positioning pins 15, 16, 17 are located on each of the radially extending members 5, and additional positioning pins 18 are located on the outer ring 4. Pins 16 and pins 18 are positioned so as to be in contact with the outermost surface of the inner backup ring 23, and outer backup ring 21, respectively, when the parts 9 are first positioned on the base 2 at room temperature. Prior to brazing, pins 15 are in spaced relation to the radially innermost face 27 of the inner backup ring 23 and pins 17 are positioned in spaced relation to the radially innermost face 27 of the outer backup ring 21 at room temperature. Additionally, at room temperature, the radially innermost surface 50 of support ring 13, is in contact with the radially outer surface 49 of the inner backup ring 23, and the radially innermost surface 50 of support ring 11 is in contact with the radially outer surface 49 of the outer backup ring 21.

Figure 2:
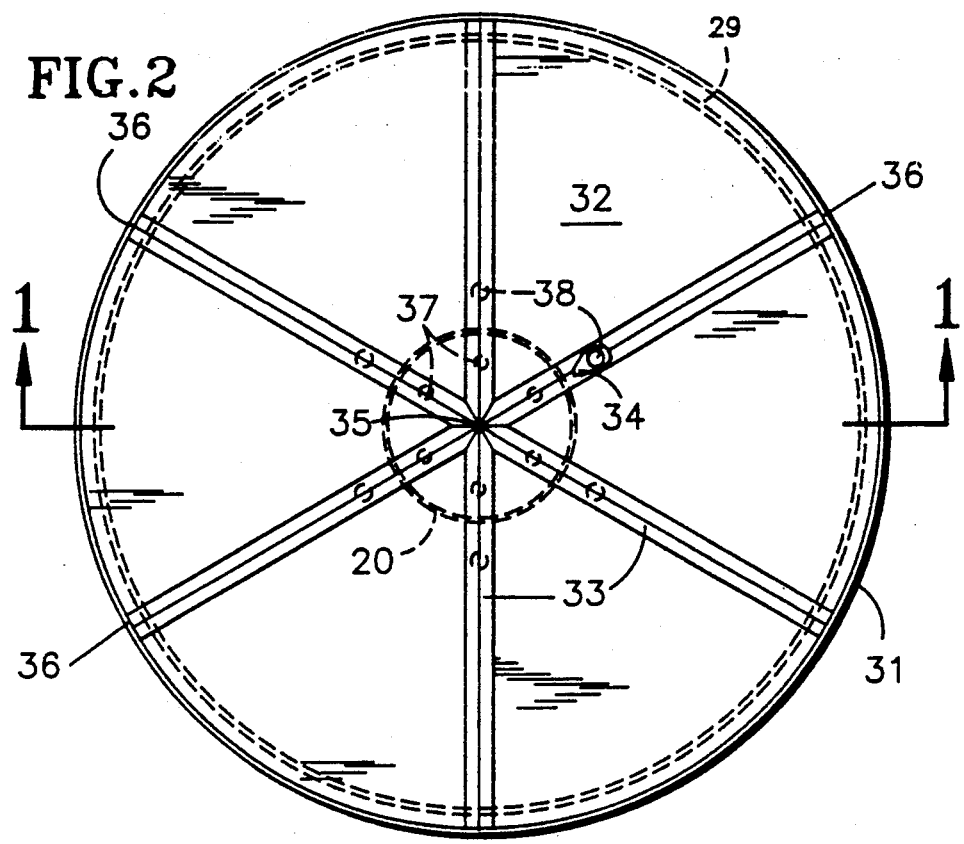
FIG. 2 is a top view of the cover of the present invention.

Inner ring 3 has a ledge 19 at its innermost diameter for supporting inner wall member 20 of the cover 1. Outer ring 4 includes a ledge 28 at its outermost diameter for supporting outer wall member 29 of the cover 1. A stiffening ring 30 is attached to the outer wall member 29 to provide additional support to ensure the outer wall member 29 remains round at braze temperature. A lip seal 31 is provided on outer ring 4 to prevent furnace contaminants from entering the integrated braze fixture between the outer wall member 29 and the ledge 28. Ceramic cloth 47, such as the type sold by the Carborundum Company under the trademark FIBERFRAX ®, may be packed into the space between the lip seal 31 and the stiffening ring 30 to further reduce the possibility of contaminants from leaking into the inner compartments of the brazing fixture. The inner wall member 20 and the outer wall member 29 are connected to the lower surface of the cover plate 32. As shown in FIG. 2, attached to the upper surface of the cover plate 32 are a plurality of cover support members 33 which prevent the cover plate 32 from sagging during extended exposure to braze temperatures. The cover support members 33, as well as the inner wall member 20 and the outer wall member 29, are connected to the cover plate 32 by welding or by any other method of connection which can withstand braze temperatures. Each cover support member 33 includes an internal passageway 34 which extends throughout the length of the cover support member 33. All of the passageways 34 intersect at the center 35 of the cover plate 32. The cover support members 33 are connected together at the center 35 in such a manner that the passageways 34 communicate with the furnace atmosphere only at the radially outermost end 36 of each passageway 34. Cover vents 37, 38 permit atmospheric communication between the internal compartments of the integrated braze fixture and the internal passageways 34 of the cover support members 33. The cover vents 37, 38 and the internal passageways 34 permit pressure equalization between the inner compartments of the integrated braze fixture and the furnace atmosphere during evacuation of the furnace without providing the opportunity for furnace contaminants to have direct line of sight into the inner compartments of the integrated braze fixture.

Referring again to FIG. 1, prior to the brazing cycle, the titanium parts to be brazed are centered on the support surface 8. The first set of positioning pins 14, 16, 18 ensure that the parts 9 and the backup rings 21, 23 are concentric when the parts 9 are positioned on the base 2 at room temperature. The radially outer surface 49 of each backup ring 21, 23 contacts the radially innermost surface 50 of each of the support rings 11, 13 ensuring that the support rings are concentric with the parts 9 at room temperature. Since the base 2 grows thermally faster than the titanium parts 9 and the support rings 11, 13, a second set of positioning pins 15, 17 is required to ensure that the backup rings 21, 23, and in turn the support rings 11, 13, remain concentric at braze temperature. In order to accomplish this, the pin clearance 39 between the second set of positioning pins 15, 17 and the radially innermost face 27 of the adjacent backup ring 21, 23 must be such that at braze temperature the second set of positioning pins 15, 17 contacts the radially innermost face 27 of the adjacent backup ring 21, 23 in a non-loadbearing manner. The second set of positioning pins 15, 17 thereby precludes non-concentric positioning of the backup rings at braze temperature. Preferably, the cover 1, the inner ring 3, the outer ring 4, the radially extending members 5, the pan inserts 6, 7 and the positioning pins 14, 15, 16, 17, 18 are all made of INCONEL 625 ®, a registered trademark of Inco Alloys International, Inc. for a superalloy containing by weight approximately 61.1% nickel, 22.0% chromium, 9.0% molybdenum, 4.0% columbium, 0.2% aluminum, 0.2% titanium, 3.0% iron, 0.15% manganese, 0.30% silicon, and 0.05% carbon. INCONEL 625 exhibits excellent weldability and has morphological stability at braze temperature, and resists the deleterious phase changes and/or dimensional changes which normally occur in many alloys as a result of repeated thermal cycling to 2000° F. Although INCONEL 625 is the preferred alloy, the cover 1, the inner ring 3, the outer ring 4, the radially extending members 5, the pan inserts 6, 7 and the positioning pins 14, 15, 16, 17, 18 could be made of any alloy having weldability, stability and thermal cycling properties similar to INCONEL 625. For example, INCONEL 617, a trademark of Inco Alloys International, Inc. for a superalloy containing by weight approximately 54.0% nickel, 22.0% chromium, 12.5% cobalt, 9.0% molybdenum, 1.0% aluminum, 0.3% titanium, and 0.07% carbon, or HAYNES TM 230, a trademark of Cabot Corporation for a superalloy containing by weight approximately 57.0% nickel, 22.0% chromium, 2.0% molybdenum, 14.0% tungsten, 0.3% aluminum, 0.5% manganese, 0.4% silicon, and 0.10% carbon, would be acceptable alloy substitutes for INCONEL 625.

The support rings 11, 13 are made of an alloy having a coefficient of thermal expansion essentially equal to that of the parts being brazed, meaning that the thermal expansion of the parts 9 and the support rings 11, 13 are be matched so that any difference in thermal expansion between the support rings 11, 13 and the parts 9 is of such a small magnitude that such difference does not cause the relative positions of the parts 9 to distort beyond allowable tolerances. As a result of this matched thermal expansion, the support rings 11, 13 and the parts 9 thermally expand at essentially the same rate. The support rings 11, 13 are preferably made of the same titanium alloy as the parts 9 and so that there is no difference in thermal expansion between the parts 9 and the support rings 11, 13. However, since the titanium alloy rings 11, 13 have a tendency to creep under their own weight at braze temperature, each of the support rings 11, 13 must be reinforced with a backup ring 21, 23. These backup rings 21, 23 are preferably made of a material such as TZM, a molybdenum alloy containing by weight approximately 0.5% titanium, 0.1% zirconium, 0.02% carbon, and the balance molybdenum. TZM exhibits superior creep strength at elevated temperatures—approximately 50 ksi at 1700° F.—and backup rings 21, 23 made of TZM maintain dimensional stability throughout the brazing cycle temperature range. By comparison, titanium will creep under its own weight at braze temperature and INCONEL 625 has a creep strength of only 3 ksi at 1700° F. To maintain dimensional repeatability after multiple brazing cycles, the positioning pins 14, 15, 16, 17, 18 can be periodically removed from the inner ring 3, the outer ring 4, and the radially extending members 5 so that the inner surfaces 8, 40, 41 and the outer surfaces 42, 43, 44 of the base 2 can be resurfaced. All surfaces of the braze fixture where dissimilar materials contact each other must be coated with a material such as aluminum oxide, which can be applied by plasma or flame spraying, to prevent alloying or bonding of dissimilar materials at elevated temperatures.

In the preferred embodiment the inner support ring 13 has an outer diameter of approximately 22 inches and the outer support ring 11 has an outer diameter of approximately 40 inches. The coefficient of thermal expansion for TZM is roughly half that of titanium, which allows the backup rings 21, 23 to be sized with respect to the support rings 11, 13 so that at braze temperature the backup rings 21, 23 exert sufficient force on the support rings to ensure that the support rings remain truly round. The TZM backup rings are sized so that at braze temperature, the TZM rings have an inner diameter which may be up to 0.01 inch less than that of the diameter which the titanium alloy support rings 11, 13 would have thermally expanded to but for the constraint of the TZM backup rings 21, 23. Since the titanium alloy support rings 11, 13 begin to become somewhat plastic at braze temperature, the support rings 11, 13 develop no significant thermal stress despite the constraint of the TZM backup rings. Ring clearance 45 must be provided between the outer diameter of each titanium support ring 11, 13 and the radially inner surface 26 of the first wall 22 of each TZM backup ring 21, 23 at room temperature to allow for thermal expansion of the support rings 11, 13 at braze temperature.

In order to further protect the parts 9 during the brazing cycle, titanium getter chips 46 must be placed on the pan inserts 6, 7 prior to brazing. The getter chips absorb any potential contaminants such as carbon, oxygen, and nitrogen, which may exist within the brazing fixture at the start of the evacuation cycle, or which may randomly find their way into the inner compartments of the brazing fixture during brazing.

Figure 4:
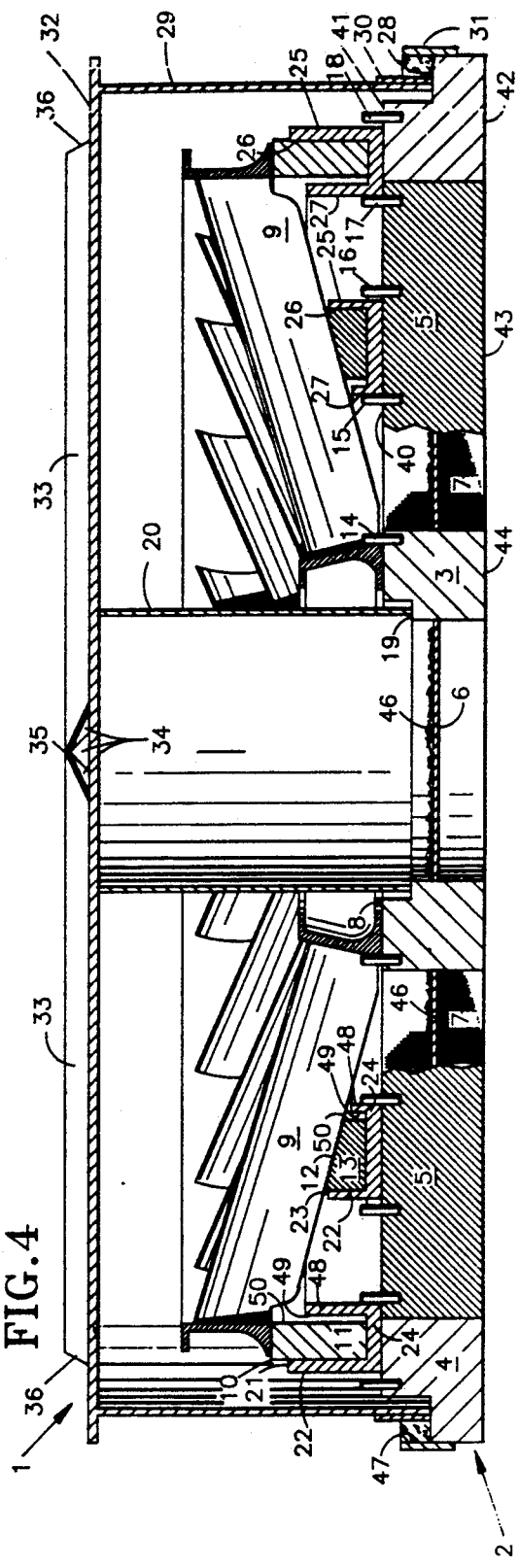
FIG. 4 is the same elevational view partly in section as shown in FIG. 1, showing the relative positions of the various elements of the fixture of the present invention at braze temperature.

In use parts 9, for example those from which a jet engine inlet is fabricated, are assembled using, for example, tack welds. The backup rings 21, 23 are positioned on the base 2, and the positioning pins 16, 18 ensure that the backup rings 21, 23 are concentric with the inner ring 3. The support rings 11, 13 are then positioned within the backup rings 21 23, so that the radially innermost surface 50 of each support ring 11, 13 contacts the radially outer surface 49 of the backup ring 21, 23 in which it is received, thereby ensuring that the support rings 11, 13 are concentric with respect to the backup rings 21, 23. The parts 9 are then placed on the support surfaces 8, 10, 12 of the base 2 using the positioning pins 14 to position the parts 9 concentric with the inner ring 3. The cover 1 is then placed over the parts as shown in FIG. 1, and the entire brazing assembly is placed in a vacuum furnace. As the furnace is evacuated, air from the interior of the integrated braze fixture escapes through the cover vents 37, 38 maintaining a pressure balance between the furnace atmosphere and the interior of the integrated braze fixture. When the furnace begins to heat up, the parts 9 and the support rings 11, 13 thermally expand at the same rate, maintaining the parts 9 in fixed relation to each other. However, the backup rings 21, 23 experience less thermal expansion than either the support rings 11, 13 or the base 2, and as a result the support rings 11, 13 and the base 2 slide radially with respect to the backup rings 21, 23. Neither the base 2 nor the cover 1 interferes with concentric thermal expansion of the support rings 11, 13 because the backup rings 21, 23 support the support rings 11, 13 in spaced relation to the base 2 and the cover 1 throughout the brazing cycle. As shown in FIG. 4, near braze temperature the second set of positioning pins 15, 17 contact the radially innermost face 27 of each of the backup rings 21, 23, ensuring that the two backup rings 21, 23 remain concentric with the inner ring 3, and the support rings 11, 13 expand into contact with the radially inner surface 26 of each of the backup rings 21, 23 thereby maintaining the concentric positioning of the support rings 11, 13 and the inner ring 3 at braze temperature. Once the brazing is completed, the parts 9 and the brazing fixture are allowed to cool down slowly, so that the support rings 11, 13 and the parts 9 thermally contract at the same rate.

By matching the thermal expansion of the support rings 11, 13 with that of the parts 9, the integrated brazing fixture of the present invention maintains the parts 9 in fixed relation to each other throughout the brazing cycle. As a result of this matched thermal expansion, the parts 9 experience essentially no resistance from the members which support them as they thermally expand and contract during the brazing cycle. Therefore, post-braze residual stress in the parts 9 is significantly less than that which could be achieved using a conventional brazing fixture, and thermal distortion of the parts 9 is reduced so that significantly less post-braze machining is necessary to bring the parts 9 to within specification tolerances.

Although this invention has been shown and described with respect to a detailed embodiment thereof, it will be understood by those skilled in the art that various changes in form and detail thereof may be made without departing from the spirit and scope of the claimed invention.

We claim:

1. A brazing fixture for maintaining metal parts in fixed relation to each other prior to and during a brazing cycle from room temperature to braze temperature and back to room temperature within in a brazing furnace, said fixture comprising:
   a base; and,
   support means located on said base, said support means including primary support means for contacting and supporting the metal parts and secondary support means in contact with said primary support means and said base for supporting said primary support means in spaced relation to said base such that contact between said primary support means and said base is prevented throughout the brazing cycle, said primary support means made of a material that has a coefficient of thermal expansion essentially equal to that of the metal parts;
   wherein during the brazing cycle, said secondary support means slides with respect to said base, said primary support means slides with respect to said secondary support means, and said primary support means thermally expands at the essentially the same rate as the parts thereby maintaining the parts in fixed relation to each other.

2. The brazing fixture of claim 1 further comprising positioning means for positioning the metal parts and the secondary support means prior to and during the brazing cycle.

3. The brazing fixture of claim 2 wherein said primary support means includes support surfaces, said primary support means contacts said parts at said support surfaces, and said primary support means remains fixed with respect to said parts at said support surfaces throughout the brazing cycle.

4. The brazing fixture of claim 3 wherein said positioning means includes first position means and second position means, and prior to the brazing cycle, said first position means is in contact with said metal parts and said secondary support means, and said second position means is spaced from said secondary support means.

5. The brazing fixture of claim 4 wherein at braze temperature, said second position means is in contact with said secondary support means, and said first position means is spaced from said secondary support means.

6. The brazing fixture of claim 5 wherein said primary support means comprise a plurality of support rings, and said secondary support means comprise a plurality of backup rings;
wherein each of said support rings, said backup rings, and said base includes a coating which prevents alloying or bonding of dissimilar materials at braze temperature.

7. The brazing fixture of claim 6 wherein each of said plurality of support rings is concentrically received within one of said plurality of backup rings, each of said backup rings slideably rests on said base, each backup ring having a first wall, a second wall, and a third wall, said first wall and said third wall perpendicular to said second wall, said second wall connecting said first wall to said third wall, said first wall including a radially outermost face and a radially inner surface, said third wall including a radially innermost face and a radially outer surface, and the second wall of each of said backup rings extends between said base and one of said plurality of support rings.

8. The brazing fixture of claim 7 wherein at room temperature, each of said support rings is radially spaced from, and concentric with, said radially inner surface of the backup ring in which it is received, and at braze temperature each of said support rings contacts said radially inner surface of the backup ring in which it is received all along said radially inner surface without developing significant thermal stress in said support rings.

9. The brazing fixture of claim 8 wherein said base comprises an inner ring having an outer diameter, an outer ring having an inner diameter, and a plurality of radially extending members which extend from said outer diameter of said inner ring to said inner diameter of said outer ring.

10. The brazing fixture of claim 9 wherein the base further comprises a plurality of pan inserts, getter means located on each of said plurality of pan inserts, each of said plurality of pan inserts having a perimeter, each pan insert connected along the entirety of said perimeter to the inner ring, the outer ring, or said radially extending members to prevent furnace contaminants from passing through the base.

11. The brazing fixture of claim 10 wherein said first position means comprise a first set of pins and said second position means comprise a second set of pins, said first set and said second set of pins cooperate with holes in said base, and prior to the brazing cycle said first set contacts the radially outermost face of each of said first walls, and at braze temperature said second set contacts said radially innermost face of each of said third walls.

12. The brazing fixture of claim 11 further comprising cover means which cooperate with said base to prevent furnace contaminants from contacting said parts during the brazing cycle, wherein said cover means includes:
a cover plate having a first side, a second side, and a center; and,
an outer wall member having a first edge and a second edge, said first edge connected to said first side of said cover plate;
wherein said second edge cooperates with a lip seal on said base and a ceramic cloth seal to prevent furnace contaminants from passing between said second edge and said base.

13. The brazing fixture of claim 12 wherein said cover means further includes a plurality of cover support members connected to said second side of said cover plate, each of said cover support members includes an internal passageway, said first side of said cover plate includes a plurality of vent holes, and said first side communicates with each of said internal passageways by means of at least one of said vent holes to permit pressure equalization between said first side and said second side of said cover plate during the brazing cycle.

14. The brazing fixture of claim 13 wherein each of said cover support members extends radially outward from said center, and the radially innermost end of each of said cover support members is sealingly connected together at said center to prevent furnace contaminants from entering said internal passageways at the radially innermost end of each of said cover support members.

15. The braze fixture of claim 14 wherein said cover further comprises an inner wall member connected to said first side of said cover plate, said inner wall cooperating with a ledge on said inner ring to support the cover plate.

16. The brazing fixture of claim 15 wherein said base is made of INCONEL 625.

17. The brazing fixture of claim 16 wherein said backup rings are made of TZM.

18. The brazing fixture of claim 17 wherein said coating is aluminum oxide.

19. The brazing fixture of claim 18 wherein said support rings and said metal parts are made of the same alloy.

20. A method of maintaining metal parts in fixed relation to each other prior to and during brazing in a brazing furnace, said method comprising:
positioning said metal parts on support means at room temperature, said support means located on a base and including primary support means which has a coefficient of thermal expansion essentially equal to that of the parts being brazed, secondary support means concentric with, and in contact with, said primary support means for supporting said primary support means, said primary support means, said secondary support means, and said base each including a coating which prevents the primary support means, the secondary support means and said base from alloying or bonding to each other or to said metal parts at braze temperature;
heating said metal parts up to braze temperature in said furnace, said heating causing said primary support means and said base to slide with respect to said secondary support means, said heating occurring at a rate which causes the metal parts and the primary support means to thermally expand at essentially the same rate so that the parts do not slide with respect to said primary support means;
providing positioning means on said base for ensuring that said secondary support means is correctly positioned with said base at braze temperature;
supporting said primary support means with said secondary support means at braze temperature to ensure that said primary support means supports said metal parts in fixed relation to each other during brazing of the metal parts; and,
cooling said metal parts back down to room temperature in said furnace, said cooling occurring at a rate which causes the metal parts and the primary support means to thermally contract at the same rate so that the parts do not slide with respect to said primary support means.

* * * * *